US012185348B2

(12) United States Patent
Wu et al.

(10) Patent No.: US 12,185,348 B2
(45) Date of Patent: Dec. 31, 2024

(54) SIDELINK INTERFERENCE CANCELLATION

(71) Applicant: QUALCOMM Incorporated, San Diego, CA (US)

(72) Inventors: Shuanshuan Wu, San Diego, CA (US); Junyi Li, Fairless Hills, PA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 17/654,675

(22) Filed: Mar. 14, 2022

(65) Prior Publication Data
US 2023/0292352 A1  Sep. 14, 2023

(51) Int. Cl.
| | | |
|---|---|---|
| H04L 47/72 | (2022.01) | |
| H04B 17/318 | (2015.01) | |
| H04W 24/10 | (2009.01) | |
| H04W 28/26 | (2009.01) | |
| H04W 72/044 | (2023.01) | |
| H04W 72/25 | (2023.01) | |
| H04W 72/541 | (2023.01) | |

(52) U.S. Cl.
CPC ........ *H04W 72/541* (2023.01); *H04B 17/318* (2015.01); *H04W 24/10* (2013.01); *H04W 28/26* (2013.01); *H04W 72/044* (2013.01)

(58) Field of Classification Search
CPC ... H04W 72/541; H04W 24/20; H04W 28/26; H04W 72/044; H04B 17/318; H04L 47/72
See application file for complete search history.

(56) References Cited

U.S. PATENT DOCUMENTS

| | | | |
|---|---|---|---|
| 2016/0269144 A1 | 9/2016 | Barbieri et al. | |
| 2018/0007724 A1 | 1/2018 | Kazmi et al. | |
| 2019/0387377 A1* | 12/2019 | Zhang | H04W 52/383 |
| 2020/0178256 A1* | 6/2020 | Tang | H04W 72/0453 |
| 2020/0304159 A1* | 9/2020 | Liao | H04W 72/23 |
| 2021/0219320 A1 | 7/2021 | Belleschi et al. | |
| 2022/0014332 A1* | 1/2022 | Wang | H04L 5/0094 |
| 2022/0095280 A1* | 3/2022 | Farag | H04W 72/23 |

(Continued)

FOREIGN PATENT DOCUMENTS

| | | | | |
|---|---|---|---|---|
| WO | WO-2020033089 A1 * | 2/2020 | | H04L 1/1819 |
| WO | WO-2021215822 A1 * | 10/2021 | | H04W 4/40 |

OTHER PUBLICATIONS

3GPP TSG-RAN WG1 Meeting#90, R1-1713041 Title:On scheduling of sPDSCH and sPUSCH (Year: 2017).*

(Continued)

*Primary Examiner* — Christopher M Crutchfield
*Assistant Examiner* — Abusayeed M Haque
(74) *Attorney, Agent, or Firm* — Harrity & Harrity, LLP

(57) ABSTRACT

Various aspects of the present disclosure generally relate to wireless communication. In some aspects, a mobile station may obtain an indication of an overlap between a plurality of sidelink communications. The mobile station may detect a conflict between the plurality of sidelink communications having the overlap based at least in part on whether the plurality of sidelink communications are intended for an interference cancellation capable receiver mobile station. Numerous other aspects are described.

30 Claims, 10 Drawing Sheets

(56) References Cited

U.S. PATENT DOCUMENTS

2022/0225288 A1* 7/2022 Park .................. H04W 72/20
2023/0319951 A1* 10/2023 Cai ................... H04W 72/25
                                                370/252
2024/0073875 A1*  2/2024 Leon Calvo ........ H04W 72/25

OTHER PUBLICATIONS

3GPP TSG-RAN WG1 Meeting#96, R1-1902207 Title:Uplink Power Control for NR-NR DC (Year: 2019).*
International Search Report and Written Opinion—PCT/US2023/063028—ISA/EPO—Jun. 16, 2023.

* cited by examiner

SIDELINK INTERFERENCE CANCELLATION

FIELD OF THE DISCLOSURE

Aspects of the present disclosure generally relate to wireless communication and to techniques and apparatuses for sidelink interference cancellation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a mobile station. The method may include obtaining, by the mobile station, an indication of an overlap between a plurality of sidelink communications. The method may include detecting, by the mobile station, a conflict between the plurality of sidelink communications having the overlap based at least in part on whether the plurality of sidelink communications are intended for an interference cancellation capable receiver mobile station.

Some aspects described herein relate to an apparatus for wireless communication performed by a mobile station. The apparatus may include a memory and one or more processors, coupled to the memory. The one or more processors may be configured to obtain, by the mobile station, an indication of an overlap between a plurality of sidelink communications. The one or more processors may be configured to detect, by the mobile station, a conflict between the plurality of sidelink communications having the overlap based at least in part on whether the plurality of sidelink communications are intended for an interference cancellation capable receiver mobile station.

Some aspects described herein relate to a non-transitory computer-readable medium that stores a set of instructions for wireless communication by a mobile station. The set of instructions, when executed by one or more processors of the mobile station, may cause the mobile station to obtain an indication of an overlap between a plurality of sidelink communications. The set of instructions, when executed by one or more processors of the mobile station, may cause the mobile station to detect a conflict between the plurality of sidelink communications having the overlap based at least in part on whether the plurality of sidelink communications are intended for an interference cancellation capable receiver mobile station.

Some aspects described herein relate to an apparatus for wireless communication. The apparatus may include means for obtaining an indication of an overlap between a plurality of sidelink communications. The apparatus may include means for detecting a conflict between the plurality of sidelink communications having the overlap based at least in part on whether the plurality of sidelink communications are intended for an interference cancellation capable receiver mobile station.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
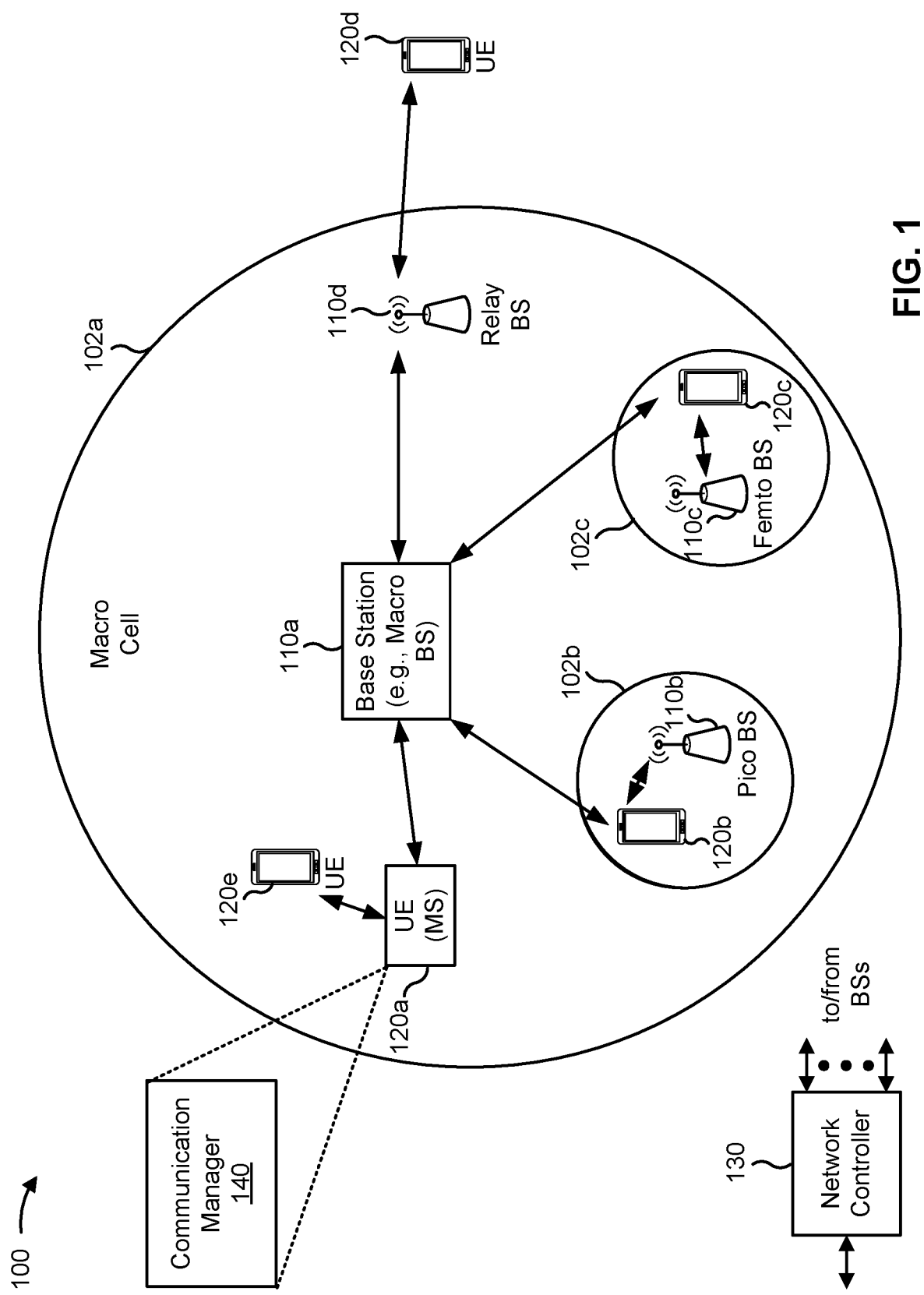
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. In some cases, the UE 120 may be a mobile station (MS). A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base-station-type operation or network design may consider aggregation characteristics of base station functionality. For example, disaggregated base stations may be utilized in an integrated access backhaul (IAB) network, an 0-RAN (such as the network configuration sponsored by the 0-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a mobile station (e.g., the UE 120) may include a communication manager 140. As described in more detail elsewhere herein, the communication manager 140 may obtain an indication of an overlap between a plurality of sidelink communications; and detect a conflict between the plurality of sidelink communications having the overlap based at least in part on whether the plurality of sidelink communications are intended for an interference cancellation capable receiver mobile station. Additionally, or alternatively, the communication manager 140 may perform one or more other operations described herein.

As indicated above, FIG. 1 is provided as an example. Other examples may differ from what is described with regard to FIG. 1.

Figure 2:
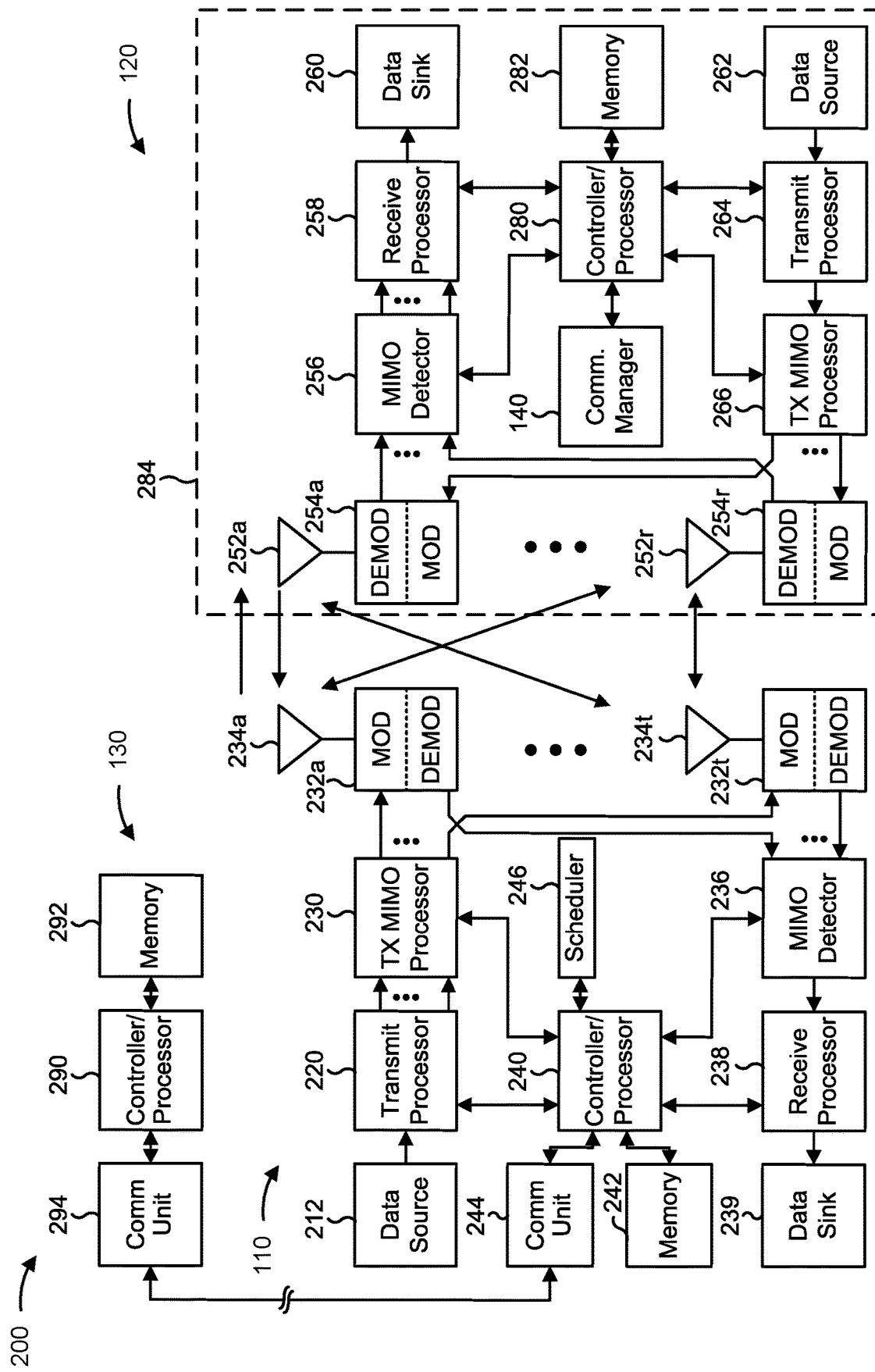
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-10).

The controller/processor 240 of the base station 110, the controller/processor 280 of the UE 120, and/or any other component(s) of FIG. 2 may perform one or more techniques associated with sidelink interference cancellation, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some examples, executing instructions may include running the instructions, converting the instructions, compiling the instructions, and/or interpreting the instructions, among other examples. In some cases, the mobile station 805 and/or the mobile station 810 described herein may be the UE 120, may be included in the UE 120, or may include one or more components of the UE 120 shown in FIG. 2.

In some aspects, the mobile station includes means for obtaining, by the mobile station, an indication of an overlap between a plurality of sidelink communications; and/or means for detecting, by the mobile station, a conflict between the plurality of sidelink communications having the overlap based at least in part on whether the plurality of sidelink communications are intended for an interference cancellation capable receiver mobile station. In some aspects, the means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
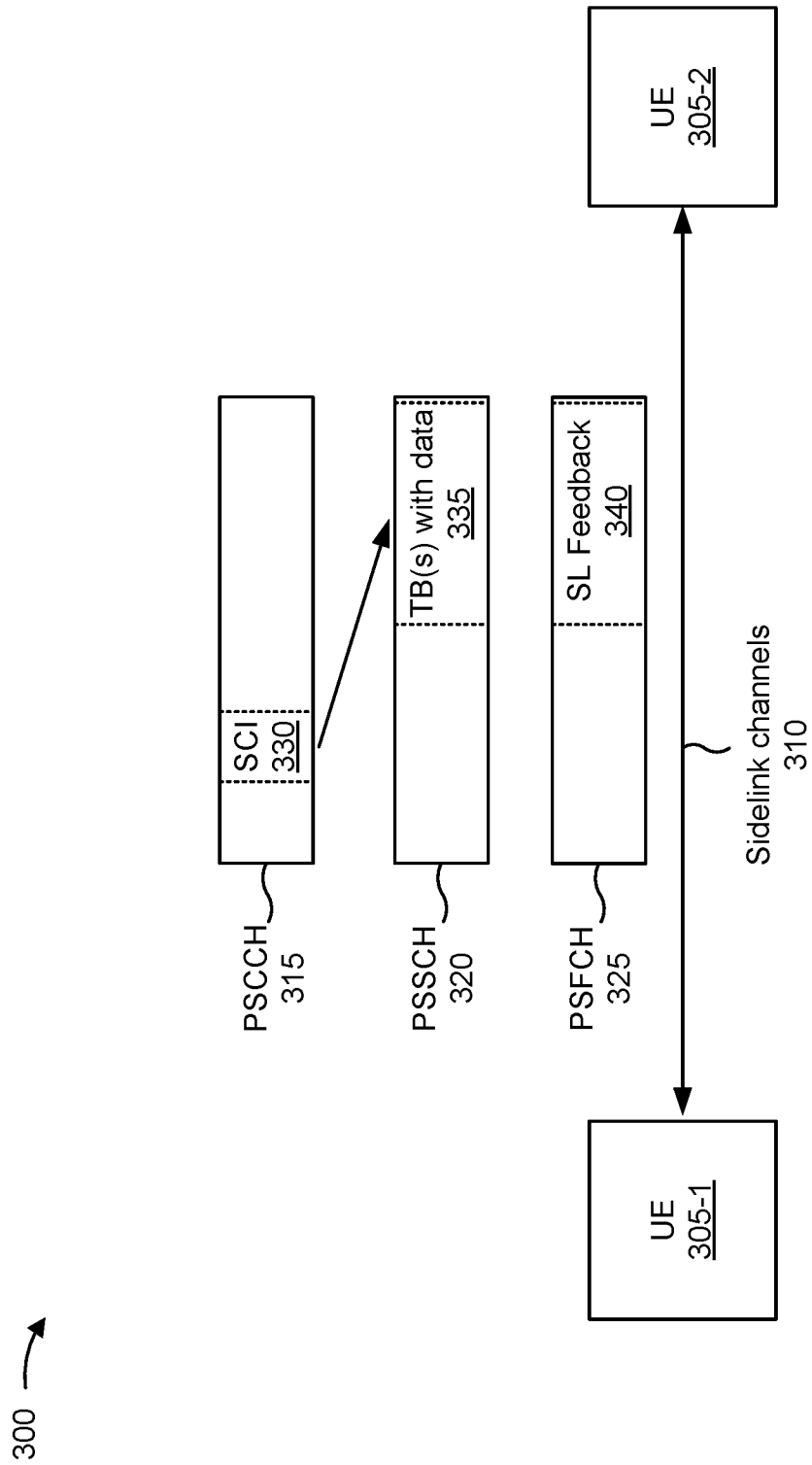
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some cases, the UE 305-1 may transmit an indication of whether a plurality of overlapping sidelink communications are intended for an interference cancellation capable receiver UE, and the UE 305-2 may determine whether there is a conflict in the plurality of sidelink communications based at least in part on the indication.

As indicated above, FIG. 3 is provided as an example. Other examples may differ from what is described with respect to FIG. 3.

Figure 4:
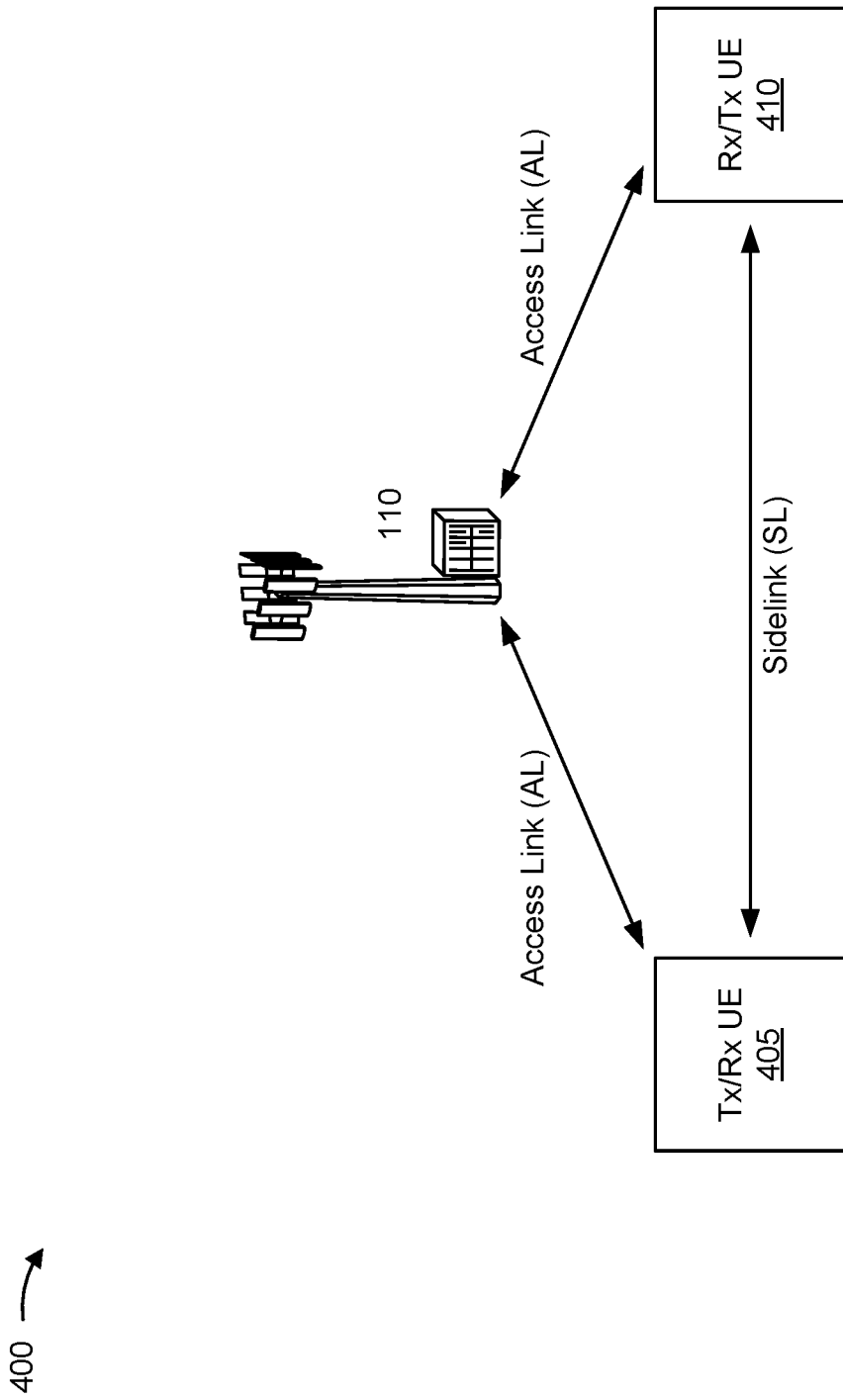
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some cases, the UE 405 may transmit an indication of whether a plurality of overlapping sidelink communications are intended for an interference cancellation capable receiver UE, and the UE 410 may determine whether there is a conflict in the plurality of sidelink communications based at least in part on the indication.

As indicated above, FIG. 4 is provided as an example. Other examples may differ from what is described with respect to FIG. 4.

Figure 5:
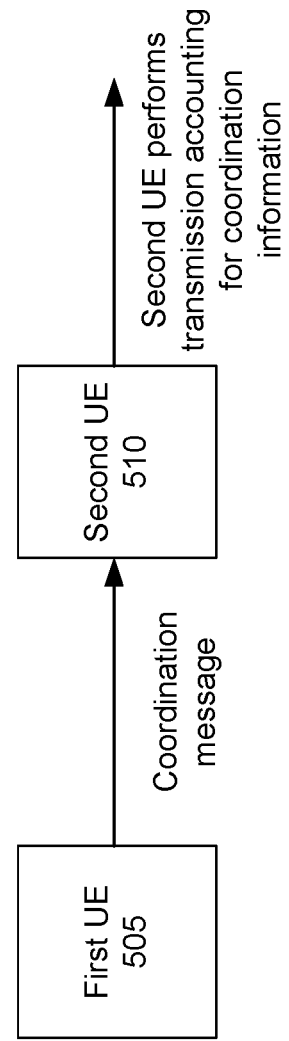
FIG. 5 is a diagram illustrating an example of coordination signaling, in accordance with the present disclosure.

FIG. 5 is a diagram illustrating an example 500 of coordination signaling, in accordance with the present disclosure.

In example 500, a first UE 505 exchanges inter-UE coordination signaling with a second UE 510. The first UE 505 and the second UE 510 may operate in an in-coverage mode, a partial coverage mode, or an out-of-coverage mode with a base station 110. The first UE 505 may determine a set of sidelink resources available for a resource allocation. The first UE 505 may determine the set of sidelink resources based at least in part on determining that the set of sidelink resources are to be selected or based at least in part on a request, referred to herein as an inter-UE coordination request, received from the second UE 510 or a base station 110. In some aspects, the first UE 505 may determine the set of sidelink resources based at least in part on a sensing operation, which may be performed before receiving an inter-UE coordination request or after receiving the inter-UE coordination request.

The first UE 505 may transmit an indication of the set of available resources to the second UE 510 via inter-UE coordination signaling (shown as a coordination message, and referred to in some aspects as an inter-UE coordination message or inter-UE coordination information). In some aspects, the first UE 505 may transmit the indication of the set of available resources while operating in NR sidelink resource allocation Mode 2. In NR sidelink resource allocation Mode 2, resource allocation is handled by UEs (e.g., in comparison to NR sidelink resource allocation Mode 1, in which resource allocation is handled by a scheduling entity, such as a base station 110).

In some cases, the second UE 510 (or the first UE 505) may select and reserve a number of resources (e.g., one or two resources) in a number of future slots for retransmission of the same transport block. The second UE 510 may indicate the repetition of the reservation for transmission of another transport block. The indication may indicate a period value of the reservation (e.g., for periodic reservations). In some cases, the reservation may be indicated in SCI (e.g., first state SCI carried by the PSCCH). In some cases, the second UE 510 may make the resource selection (e.g., resource allocation) based at least in part on monitoring sidelink transmissions from other UEs, such as the first UE 505, such that the second UE 510 can select resources that have not been reserved by the other UEs. In some cases, resource selection may be based at least in part on an RSRP measurement. For example resource reserved by a UE may be considered as being available if the RSRP measured from a signal sent by that UE is below an RSRP threshold.

In some cases (e.g., for Mode 2), the resource reservation may be based at least in part on sensing. For example, a transmitter UE (e.g., the second UE 510) may decode an SCI from another UE (e.g., the first UE 505) which may indicate resource reservations in future slots. Based on the decoded reservations from the SCI (e.g., in addition to an RSRP measurement), the second UE 510 may determine the candidate resources in a resource selection window (e.g., with the reserved resources having an RSRP value that is greater than an RSRP threshold being excluded). In some cases, the second UE 510 may randomly select resources from the candidate resources in the resource selection window. In one example, the second UE 510 may decode sidelink transmissions. When the resource selection is triggered, the second UE 510 may look back to decoding outcomes in the sensing window. Based at least in part on decoding outcomes in the sensing window, the second UE 510 may determine one or more candidate resources in a future resource selection window. For example, the reserved resources may be excluded, and the remaining resources may be candidate resources. The second UE 510 may select a resource from the resource selection window.

In some cases, the indication of the set of available resources may identify resources that are preferred by the first UE 505 for transmissions by the second UE 510. Alternatively, the indication of the set of available resources may identify resources that are not preferred by the first UE 505 for transmissions by the second UE 510 (e.g., with the available resources being those other than the resources that are not preferred). Additionally, or alternatively, the inter-UE coordination signaling may indicate a resource conflict (e.g., a collision), such as when two UEs have reserved the same resource (e.g., and were unable to detect this conflict because the two UEs transmitted a resource reservation message on the same resource and thus did not receive one another's resource reservation messages due to a half-duplex constraint).

The second UE 510 may select a sidelink resource for a transmission from the second UE 510 based at least in part on the set of available resources indicated by the first UE 505. As shown, the second UE 510 may account for the coordination information when transmitting (e.g., via a sidelink resource indicated as available by the inter-UE coordination message). Inter-UE coordination signaling related to resource allocation may reduce collisions between the first UE 505 and the second UE 510 and may reduce a power consumption for the first UE 505 and/or the second UE 510 (e.g., due to fewer retransmissions as a result of fewer collisions).

Although FIG. 5 shows a single first UE 505 transmitting inter-UE coordination information to a single second UE 510, in some aspects, a single first UE 505 may transmit inter-UE coordination information to multiple UEs to assist those UEs with selecting resources for transmissions. Additionally, or alternatively, the second UE 510 may receive inter-UE coordination information from multiple UEs, and may use that information to select resources for a transmission (e.g., resources that avoid a conflict with all of the multiple UEs or as many as possible).

As indicated above, FIG. 5 is provided as an example. Other examples may differ from what is described with respect to FIG. 5.

Figure 6:
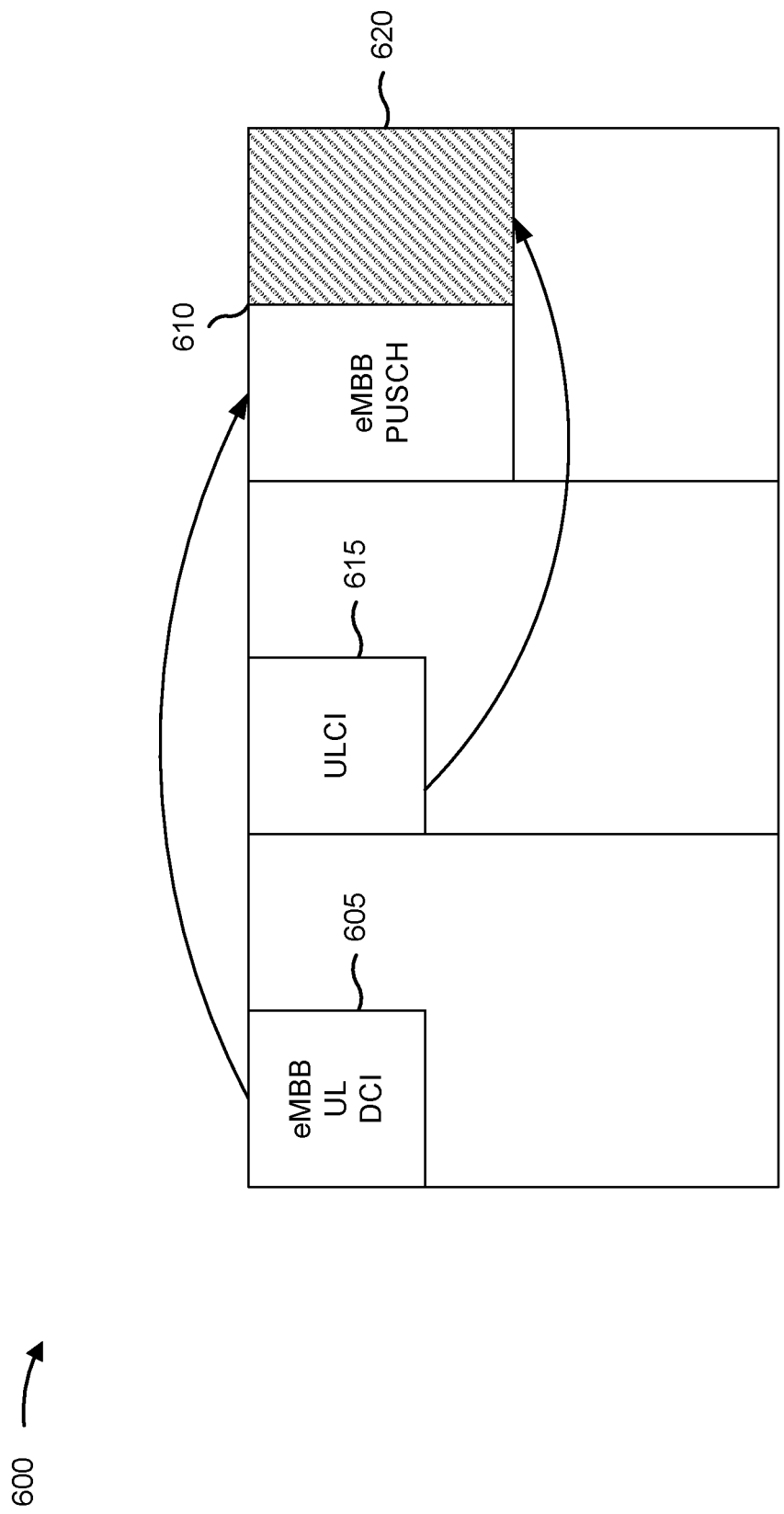
FIG. 6 is a diagram illustrating an example of an uplink cancellation indication, in accordance with the present disclosure.

FIG. 6 is a diagram illustrating an example 600 of an uplink cancellation indication (ULCI), in accordance with the present disclosure.

A ULCI is an indication that cancels a previously scheduled resource for an uplink (e.g., PUSCH) transmission for a UE. The ULCI may be used to support uplink transmissions of traffic with different priorities (e.g., enhance mobile broadband (eMBB) traffic and ultra-reliable low-latency communication (URLLC) traffic) in a wireless network. For example, a network node (e.g., an aggregated or disaggregated base station) may use a ULCI to preempt a scheduled PUSCH transmission by a low priority (e.g., eMBB) UE in a resource with a PUSCH transmission by a high priority (e.g., URLLC) UE. As a result, latency of high priority (e.g., URLLC) uplink traffic may be improved.

As shown in FIG. 6, the network node may transmit, to an eMBB UE, DCI 605 that includes an uplink grant for the eMBB UE. The DCI 605 may include scheduling information that schedules PUSCH resources 610 for a PUSCH communication by the eMBB UE. For example, the PUSCH 610 may include time and frequency resources (e.g., RBs) allocated for the eMBB UE to transmit the PUSCH communication to the network node. The network node, prior to the eMBB UE transmitting the PUSCH communication on the allocated PUSCH resources 610, may transmit a ULCI 615 to the eMBB UE. The ULCI may cancel one or more resources 620 of the allocated PUSCH resources 610 for the scheduled PUSCH communication by the eMBB UE. In some cases, the ULCI may be included in DCI format 2_4 (DCI 2_4). For example, the network node may transmit the ULCI to the eMBB UE in group common PDCCH (GC-PDCCH) DCI 2_4 using a cancellation indication radio network temporary identifier (CI-RNTI). The payload of the DCI 2_4 may indicate which time and frequency resources (e.g., which RBs) 620 are being canceled. The eMBB, in connection with receiving the ULCI 615, may cancel PUSCH communications scheduled on the resources 620 identified by the ULCI 615. The network node may then allocate the canceled resources for a PUSCH communication from a high priority (e.g., URLLC) UE.

In some cases, a ULCI may only apply to resources allocated for PUSCH transmissions (e.g., including repetitions) and sounding reference signal (SRS) transmissions. In some cases, such as in a case in which an uplinkCancellationPriority parameter is provided, a ULCI may only cancel low priority (e.g., eMBB) PUSCH transmissions.

As indicated above, FIG. 6 is provided as an example. Other examples may differ from what is described with respect to FIG. 6.

Figure 7:
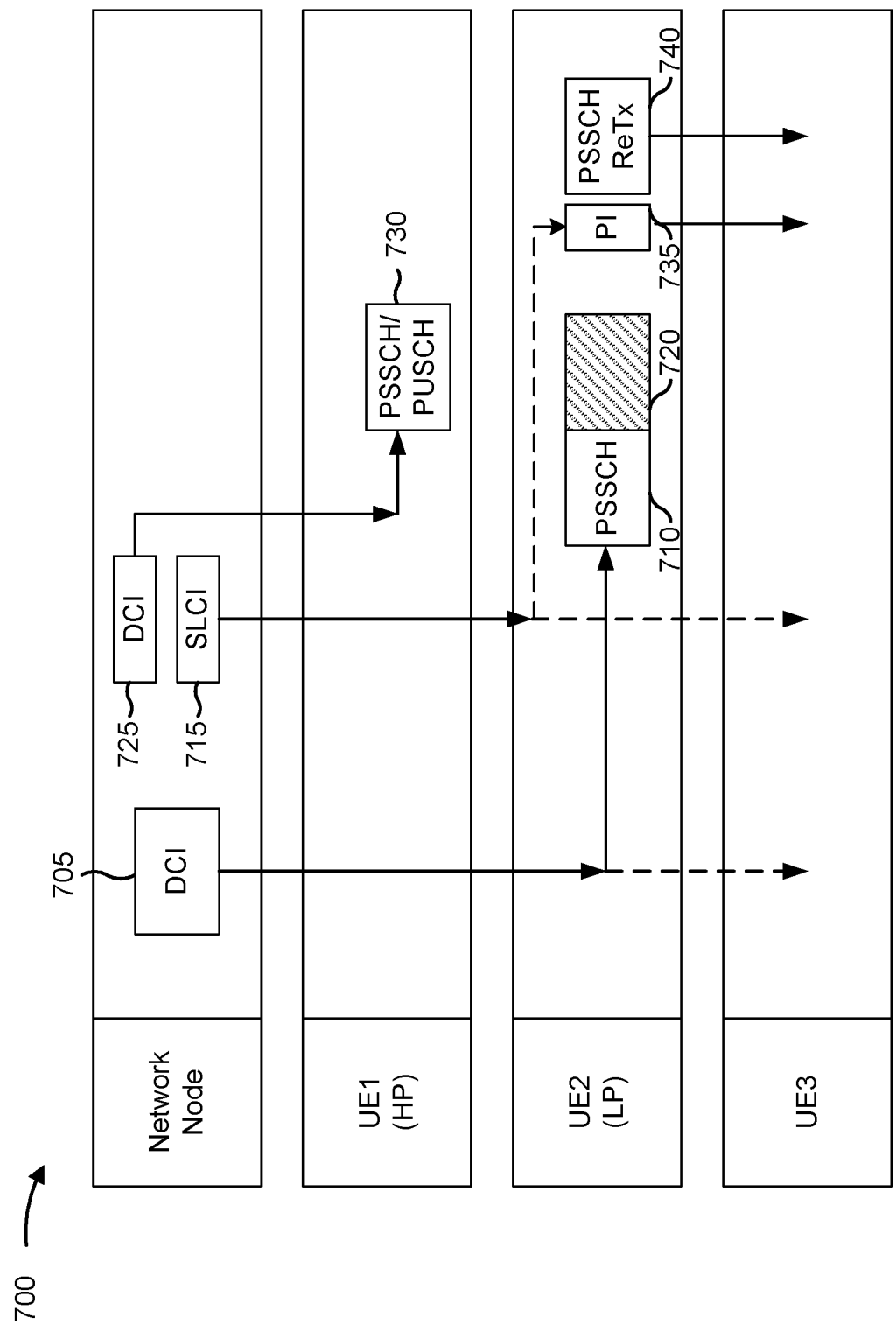
FIG. 7 is a diagram illustrating an example of a sidelink cancellation indication, in accordance with the present disclosure.

FIG. 7 is a diagram illustrating an example 700 of a sidelink cancellation indication (SLCI), in accordance with the present disclosure.

In a sidelink transmission mode (e.g., Mode 1) in which the network node (e.g., the aggregated or disaggregated base station) allocates resources for sidelink communications between UEs, the network node may indicate scheduled resources for sidelink communications via DCI format 3_0 (DCI 3_0). In some cases, the UE 120 may transmit sidelink communications (e.g., PSSCH/PSCCH) via uplink resources indicated in the DCI 3_0 received from the network node. However, a network node may not be able to use a ULCI (e.g., DCI 2_4) to cancel a scheduled sidelink communication (e.g., PSSCH/PSCCH). This may limit the network node's flexibility in scheduling high priority (e.g., URLLC) traffic if low priority (e.g., eMBB) sidelink traffic cannot be canceled. In some cases, an SLCI may be used to cancel PSSCH and/or PSCCH communications. An SLCI is an indication that cancels a previously scheduled resource for a sidelink communication for a UE.

As shown in FIG. 7, example 700 includes a network node, a first UE (UE1), a second UE (UE2), and a third UE (UE3). UE1 may be a high priority UE that transmits high priority (e.g., URLLC) traffic, and UE2 may be a low priority UE that transmits low priority (e.g., eMBB) traffic. As shown in FIG. 7, the network node may transmit, to UE2, DCI 705 that schedules a sidelink communication for UE2. For example, the DCI 705 may schedule a PSSCH communication to be transmitted from UE2 to UE3. In some cases, the DCI 705 may be DCI 3_0 that includes scheduling information that allocates PSSCH resources 710 for the PSSCH communication. In some cases, such as in a case in which UE3 is within a coverage range of the network node, the network node may transmit the DCI 705 to UE3, as well as UE2. In some cases, such as in a case in which UE3 is not within a coverage range of the network node, UE2 may forward the DCI 705 to UE3.

As further shown in FIG. 7, the network node, prior to the UE2 transmitting the PSSCH communication to UE3 on the allocated PSSCH resources 710, may transmit an SLCI 715 to UE2. In a case in which UE3 is in a coverage range of the network node, the network node may also transmit the SLCI to UE3. The SLCI 715 may cancel one or more resources 720 of the allocated PSSCH resources 710 for the scheduled PSSCH communication from UE2 to UE3. In some cases, such as in the case in which UE3 is not within the coverage range of the network node, UE2 may forward the SLCI 715 to UE3. The SLCI 715 may be included in DCI, and the SLCI 715 may identify time and frequency resources 720, for which PSSCH/PSCCH communications are being canceled for UE2. UE2 in connection with receiving the SLCI 715, may cancel the PSSCH communication scheduled on the resources 720 identified by the SLCI 715. The network node may transmit, to UE1, DCI 725 (e.g., DCI 3_0) allocate resources 730, including the canceled resources 720 identified in the SLCI 715, for a PSSCH communication or a PUSCH communication (e.g., including URLLC traffic) to be transmitted by UE1. In some cases, the network node may transmit the SLCI 715 to UE2 based at least in part on a URLLC traffic arrival in a buffer of UE1 in order to preempt the scheduled PSSCH communication for UE2 with a PSSCH or PUSCH transmission for UE1 that includes the URLLC traffic.

UE2, in connection with receiving the SLCI 715 that cancels the one or more resources 720 of the allocated PSSCH resources 710 for the PSSCH communication, may transmit a preemption indication (PI) 735 to UE3. For example, the PI 735 may be included in SCI transmitted from UE2. The PI 735 may indicate, to UE3 (which may be out of coverage of the network node) that the scheduled PSSCH has been canceled (or preempted). In some cases, the PI 735 may also schedule PSSCH resources 740 for re-transmitting the (previously canceled/preempted) PSSCH communication from UE2 to UE3. UE2 may then transmit the PSSCH communication on the PSSCH resources 740 indicated in the PI 735.

In some cases, a network node may use an SLCI to cancel low priority sidelink (e.g., PSSCH/PSCCH) traffic for high priority uplink (e.g., PUSCH) traffic. In some cases, a network node may use an SLCI to cancel low priority sidelink (e.g., PSSCH/PSCCH) traffic for high priority sidelink traffic. In some cases, a network node may use an SLCI to cancel scheduled sidelink (e.g., PSSCH) re-transmissions. In this case, the network node may re-transmit the data from the PSSCH communication over the Uu interface (e.g., in a PDSCH communication), and the network node may cancel the scheduled sidelink re-transmission resource. As a result, the scheduling flexibility and interference coordination for high priority traffic may be improved, resulting in improved latency and reliability of high priority (e.g., URLLC) traffic.

In some cases, a UE that is capable of performing sidelink (SL) interference cancellation (IC) may be referred to as an SL IC capable UE. The SL IC capable UE may be configured to decode a first communication, perform IC, and decode a second communication in the same resource. As a result, the SL IC capable UE may be able to decode overlapping transmissions (e.g., two transmissions that are sent in overlapping resources).

In some cases, the IC may be symbol level IC. The symbol level IC may include one or more of channel estimation, demodulation, hard decision making, reconstruction of received interfering signal, interference cancellation, and desired signal detection. In some cases, the IC may be codeword level IC (CWIC) which may involve an additional decoding step. Thus, the CWIC may be more robust than the symbol level IC.

In some cases, the SL IC capable UE may have a larger decoding capacity than a non-SL IC capable UE. This may result in the SL IC capable UE detecting more overlapping communications or reservations (e.g., multiple UEs reserving the same resource) than the non-SL IC capable UE. However, this does not necessarily mean that there are more conflicts, as the SL IC capable UE may be able to decode the overlapping communications or transmissions using the reserved resources.

In some cases, a UE (e.g., the receiver UE or another UE) may not be able to determine whether the reservation was intended for one or more SL IC capable receiver UE(s) or to one or more non-SL IC capable receiver UE(s). Thus, the UE may not be able to properly determine whether an overlapping reservation should be considered a conflict (e.g., if the receiver UE is not an SL IC capable receiver UE) or if the reservation should not be considered a conflict (e.g., if the receiver UE is an SL IC capable receiver UE). This may result in a number of reservations being incorrectly identified as conflicting reservations, even though the SL IC capable UE may be able to decode the overlapping transmissions on the reserved resources.

Techniques and apparatuses are described herein for sidelink interference cancellation. In some aspects, a UE may obtain an indication of an overlap between a plurality of sidelink communications (e.g., transmissions or reservations). For example, the UE may detect whether a first sidelink communication and a second sidelink communication occurred on the same resource. The UE may detect a conflict between the plurality of sidelink communications based at least in part on whether the plurality of sidelink communications are intended for an SL IC capable receiver UE. For example, the UE may determine that the conflict exists based at least in part on the plurality of sidelink communications being intended for at least one UE that is not the SL IC capable receiver UE. Alternatively, the UE may determine that the conflict does not exist based at least in part on the plurality of sidelink communications being only intended for the SL IC capable receiver UE or a group of SL IC capable receiver UEs.

As described above, a UE may determine a conflict between a plurality of sidelink communications without knowledge of whether the sidelink communications are intended for an SL IC capable receiver UE or a non-SL IC capable receiver UE. This may result in many conflicts being falsely identified, since the receiver UE may be able to process the overlapping sidelink communications if the receiver UE is an SL IC capable receiver UE. Using the techniques and apparatuses described herein, the UE may obtain an indication of whether or not the receiver UE is an SL IC capable UE, and may determine whether a conflict exists based at least in part on the indication.

In some cases, the benefits for SL IC may be significant. For example, in a broadcast or groupcast dominated network (e.g., V2X), there may not be interference in the overlapping transmissions, or in other words, all transmissions may be desired signals from the receiver UE perspective. Sidelink reliability and network capacity may be improved using the SL IC techniques and apparatuses described herein.

As indicated above, FIG. 7 is provided as an example. Other examples may differ from what is described with respect to FIG. 7.

Figure 8:
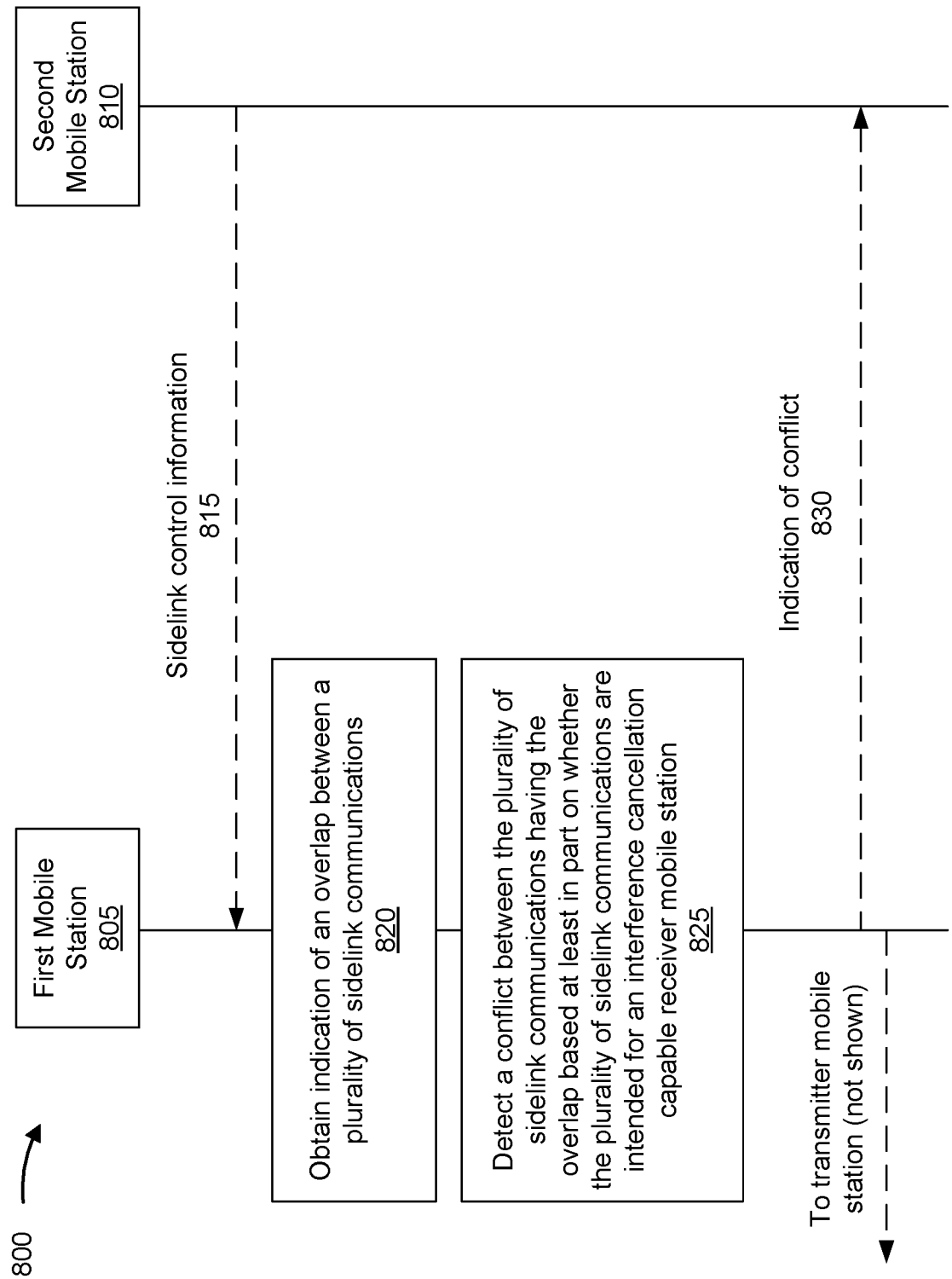
FIG. 8 is a diagram illustrating an example associated with sidelink interference cancellation, in accordance with the present disclosure.

FIG. 8 is a diagram illustrating an example 800 of sidelink interference cancellation, in accordance with the present disclosure. A first mobile station 805 may communicate with a second mobile station 810. The first mobile station 805 or the second mobile station 810 may include some or all of the features of the UE 120, the first UE 505, or the second UE 510.

As shown in connection with reference number 815, the second mobile station 810 may transmit, and the first mobile station 805 may receive, SCI or other control signaling information. The SCI may indicate whether a reservation is intended for one or more IC capable mobile stations or to one or more non-IC capable mobile stations. In some aspects, the indication may be included in one or more bits (e.g., one or more reserved bits) of a first stage SCI (e.g., SCI-1). In some aspects, the indication may be included in a second stage SCI (e.g., SCI-2).

In some aspects, the second mobile station 810 may be configured to determine one or more capabilities of the mobile stations receiving a transmission or reservation. For unicast and connected groupcast communications, signaling may be used to indicate the IC capability between the mobile stations. For example, the first mobile station 805, or one or more other mobile stations (not shown), may transmit IC capability information to the second mobile station 810. For connection-less groupcast or broadcast communications, the IC capability may be application-specific. For example, certain applications may support the IC capability of the mobile stations, while other applications may not support the IC capability of the mobile stations.

As shown in connection with reference number 820, the first mobile station 805 may obtain an indication of an overlap between a plurality of sidelink communications.

In some aspects, as described herein, the first mobile station 805 may determine that two or more transmissions occurred in an overlapping resource. For example, the first mobile station 805 may determine that a transmission by the first mobile station 805 and a transmission by another mobile station occurred in the same resource. Additionally, or alternatively, the first mobile station 805 may determine that a transmission by a first other mobile station and a transmission by a second other mobile station occurred in the same resource.

In some aspects, as described herein, the first mobile station 805 may determine that more than one reservation has occurred in a resource, and that at least one of the reservations is intended for the first mobile station 805. For example, the first mobile station 805 may determine that a first reservation intended for the first mobile station 805 and a second reservation intended for another mobile station occurred in the same resource.

As shown in connection with reference number 825, the first mobile station 805 may detect a conflict (e.g., determine whether there is a conflict) between the plurality of sidelink communications having the overlap based at least in part on whether the plurality of sidelink communications are intended for an IC capable receiver mobile station. In some aspects, the plurality of sidelink communications having the overlap (e.g., the overlapping communications) may be overlapping transmissions or overlapping reservations.

In a first example, the first mobile station 805 may determine whether there is a conflict between the overlapping communications based at least in part on whether the overlapping communications are intended for one or more IC capable receiver mobile stations (e.g., as indicated in the sidelink control information).

In this example, the first mobile station 805 may determine that a conflict does not exist if the overlapping communications are intended for IC capable receiver mobile stations. For example, if the plurality of transmissions or reservations are intended only for IC capable receiver mobile stations, the first mobile station 805 may determine that the conflict does not exist. Alternatively, the first mobile station 805 may determine that the conflict does exist if the overlapping communications are intended for at least one non-IC capable receiver mobile station. For example, if one or more of the transmissions or reservations are intended for a non-IC capable receiver mobile station, the first mobile station 805 may determine that the conflict exists.

In some aspects, the first mobile station 805 may determine whether the conflict exists based at least in part on a type of the second mobile station 810. For example, if the second mobile station 810 is a first type of mobile station (e.g., a legacy mobile station) that does not support IC capabilities, the first mobile station 805 may determine that a conflict exists between the overlapping communications. In contrast, if the second mobile station 810 is a second type of mobile station that supports IC capabilities, the first mobile station 805 may determine whether the conflict exists based at least in part on the indication included in the sidelink control information, as described above.

In a second example, the first mobile station 805 may determine whether there is a conflict between the overlapping communications based at least in part on whether the overlapping communications are intended for an IC capable receiver mobile station (e.g., as indicated in the sidelink control information) and based at least in part on an RSRP measurement.

In this example, the first mobile station 805 may determine that a conflict does not exist if the overlapping communications are intended for IC capable receiver mobile stations. For example, if the plurality of transmissions or reservations are intended only for IC capable receiver mobile stations, the first mobile station 805 may determine that the conflict does not exist. Alternatively, if the overlapping communications are intended for at least one non-IC capable receiver mobile station, the first mobile station 805 may determine whether the conflict exists based at least in part on one or more RSRP measurements.

In some aspects, the first mobile station 805 may determine that the conflict exists if the overlapping communications are intended for at least one non-IC capable receiver mobile station, and if any of the RSRPs associated with the mobile stations making the overlapping reservations is greater than, or greater than or equal to, an RSRP threshold. For example, if an RSRP associated with any of the mobile stations making the overlapping reservations is greater than, or greater than or equal to, the RSRP threshold, the first mobile station 805 may determine that the conflict exists. Alternatively, if all of the RSRPs associated with the mobile stations making the overlapping reservations are not greater than, or greater than or equal to, the RSRP threshold, the first mobile station 805 may determine that the conflict does not exist. In some aspects, the threshold may be configured in the first mobile station 805.

In some aspects, the first mobile station 805 may determine that the conflict exists if the overlapping communications are intended for at least one non-IC capable receiver mobile station, and if an RSRP (RSRP1) associated with a mobile station that has made a reservation that is not intended for the first mobile station 805 is larger than an RSRP (RSRP2) associated with a mobile station that has made a reservation that is intended for the first mobile station 805. In this case, the first mobile station 805 may determine that the conflict exists if the overlapping communications are intended for at least one non-IC capable receiver mobile station and if RSRP1 is greater than RSRP2 by an RSRP difference threshold. For example, if RSRP1 is greater than RSRP2 by an amount that is greater than, or greater than or equal to, the RSRP difference threshold, the first mobile station 805 may determine that the conflict exists. Alternatively, if RSRP1 is not greater than RSRP2 by an amount that is greater than, or greater than or equal to, the RSRP difference threshold, the first mobile station 805 may determine that the conflict does not exist.

In a third example, the first mobile station 805 may determine whether there is a conflict between the overlapping communications based at least in part on whether the overlapping communications are intended for an IC capable receiver mobile station (e.g., as indicated in the sidelink control information) and based at least in part on a plurality of RSRP thresholds.

In this example, the first mobile station 805 may determine that a conflict does not exist if the overlapping communications are intended for IC capable receiver mobile stations. For example, if the plurality of transmissions or reservations are intended only for IC capable receiver mobile stations, the first mobile station 805 may determine that the conflict does not exist. Alternatively, if the overlapping communications are intended for at least one non-IC capable receiver mobile station, the first mobile station 805 may determine whether the conflict exists based at least in part on the plurality of RSRP thresholds. In this example, a plurality of RSRP measurements may include a first RSRP measurement (RSRP1) associated with a first other mobile station that makes a first reservation, and a second RSRP measurement (RSRP2) associated with a second other mobile station that makes a second reservation. In this example, the first reservation is intended for the first mobile station 805, the second reservation may be intended for an IC capable receiver mobile station, and the first reservation and the second reservation are overlapping reservations.

In some aspects, if the second reservation is intended for an IC capable receiver mobile station, the first mobile station

805 may determine whether there is a conflict based at least in part on the first RSRP measurement being greater than, or greater than or equal to, a first RSRP threshold. For example, if the second reservation is intended for an IC capable receiver mobile station, and if the first RSRP measurement is greater than, or greater than or equal to, the first RSRP threshold, the first mobile station 805 may determine that the conflict exists. Alternatively, if the second reservation is intended for an IC capable receiver mobile station, and if the first RSRP measurement is not greater than, or greater than or equal to, the first RSRP threshold, the first mobile station 805 may determine that the conflict does not exist.

In some aspects, if the second reservation is intended for a non-IC capable receiver mobile station, the first mobile station 805 may determine whether there is a conflict based at least in part on the first RSRP measurement being greater than, or greater than or equal to, a second RSRP threshold. For example, if the second reservation is intended for a non-IC capable receiver mobile station, and if the first RSRP measurement is greater than, or greater than or equal to, the second RSRP threshold, the first mobile station 805 may determine that the conflict exists. Alternatively, if the second reservation is intended for a non-IC capable receiver mobile station, and if the first RSRP measurement is not greater than, or greater than or equal to, the second RSRP threshold, the first mobile station 805 may determine that the conflict does not exist.

In some aspects, the first RSRP threshold and the second RSRP threshold may be configured in the first mobile station 805. In some aspects, the first RSRP threshold may be smaller than the second RSRP threshold. For example, the first RSRP threshold may be associated with a first RSRP value that is less than a second RSRP value associated with the second RSRP threshold.

As shown in connection with reference number 830, the first mobile station 805 may transmit an indication of the conflict. In some aspects, the first mobile station 805 may transmit the indication of the conflict to the second mobile station 810. In some aspects, the first mobile station 805 may transmit the indication of the conflict to a transmitter mobile station, which may or may not be the second mobile station 810.

In some aspects, the transmitter mobile station may be a first transmitter mobile station (e.g., a desired mobile station) that made the overlapping reservation that is intended for the first mobile station 805. In this case, the first transmitter mobile station may be configured to re-select the resource.

In some aspects, the transmitter mobile station may be a second transmitter mobile station (e.g., a non-desired transmitter mobile station) that has made the overlapping reservation to a mobile station that is not the first mobile station 805. In this case, the second transmitter mobile station may be configured to re-select the resource.

As described above, a mobile station may be configured to determine a conflict between a plurality of sidelink communications without knowledge of whether the sidelink communications are intended for an SL IC capable receiver mobile station or a non-SL IC capable receiver mobile station. This may result in conflicts being falsely identified, since the receiver mobile station may be able to process the overlapping sidelink communications if the receiver mobile station is an SL IC capable receiver mobile station. Using the techniques and apparatuses described herein, the mobile station may obtain an indication of whether or not the receiver mobile station is an SL IC capable mobile station, and may determine whether a conflict exists based at least in part on the indication, thereby improving reliability and network capacity.

As indicated above, FIG. 8 is provided as an example. Other examples may differ from what is described with respect to FIG. 8.

Figure 9:
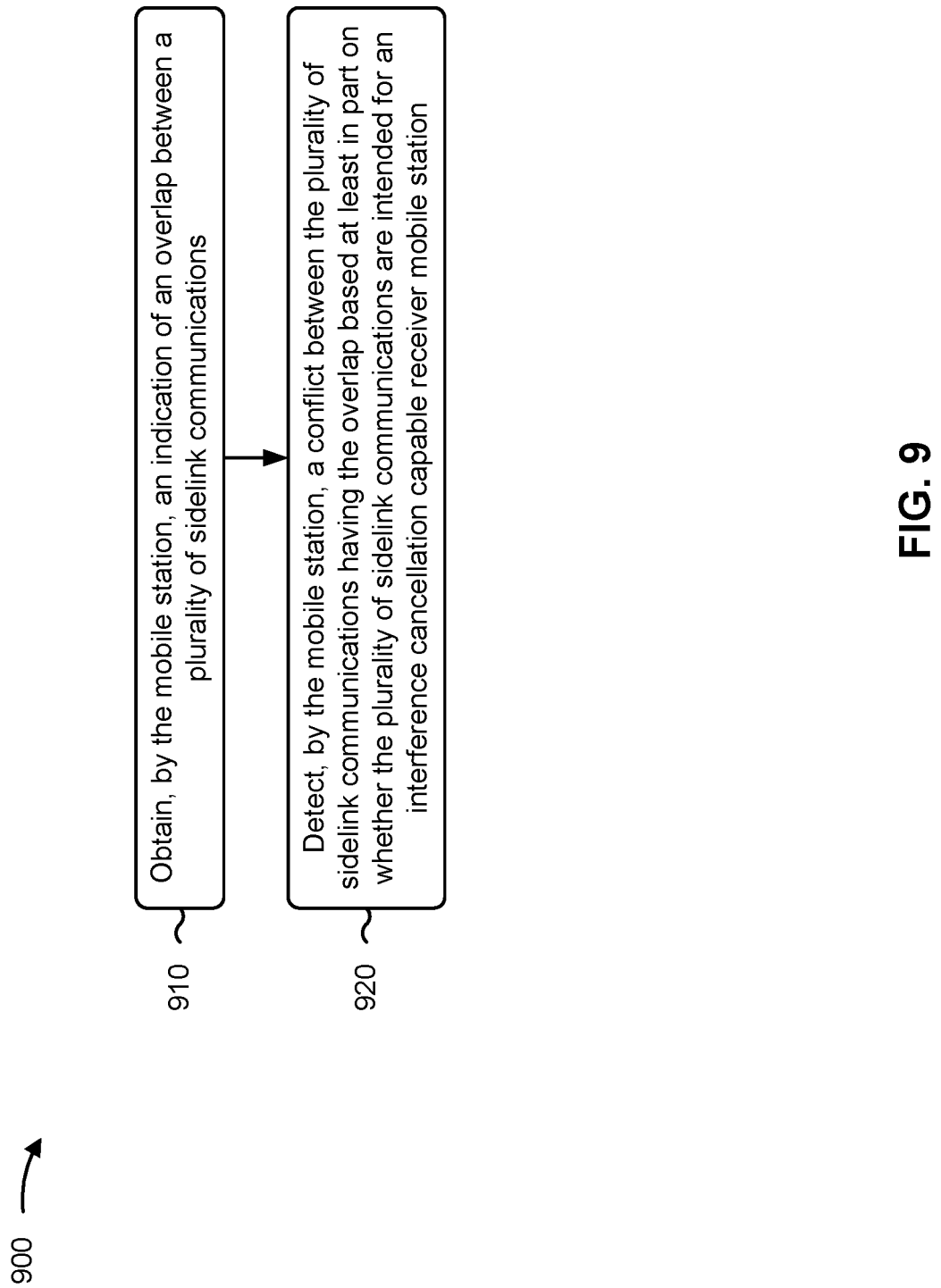
FIG. 9 is a diagram illustrating an example process associated with sidelink interference cancellation, in accordance with the present disclosure.

FIG. 9 is a diagram illustrating an example process 900 performed, for example, by a mobile station, in accordance with the present disclosure. Example process 900 is an example where the mobile station (e.g., mobile station 805) performs operations associated with sidelink interference cancellation.

As shown in FIG. 9, in some aspects, process 900 may include obtaining an indication of an overlap between a plurality of sidelink communications (block 910). For example, the mobile station (e.g., using communication manager 140 and/or obtaining component 1008, depicted in FIG. 10) may obtain an indication of an overlap between a plurality of sidelink communications, as described above.

As further shown in FIG. 9, in some aspects, process 900 may include detecting a conflict between the plurality of sidelink communications having the overlap based at least in part on whether the plurality of sidelink communications are intended for an interference cancellation capable receiver mobile station (block 920). For example, the mobile station (e.g., using communication manager 10 and/or detection component 1010, depicted in FIG. 10) may detect a conflict between the plurality of sidelink communications having the overlap based at least in part on whether the plurality of sidelink communications are intended for an interference cancellation capable receiver mobile station, as described above.

Process 900 may include additional aspects, such as any single aspect or any combination of aspects described below and/or in connection with one or more other processes described elsewhere herein.

In a first aspect, detecting the conflict comprises detecting whether a conflict exists between the plurality of sidelink communications based at least in part on the plurality of sidelink communications being intended for at least one mobile station that is not the interference cancellation capable receiver mobile station.

In a second aspect, alone or in combination with the first aspect, detecting the conflict comprises detecting whether a conflict does not exist between the plurality of sidelink communications based at least in part on the plurality of sidelink communications being only intended for the interference cancellation capable receiver mobile station or a group of interference cancellation capable receiver mobile stations.

In a third aspect, alone or in combination with one or more of the first and second aspects, process 900 includes receiving sidelink control information that indicates whether a sidelink communication, of the plurality of sidelink communications, is intended for the interference cancellation capable receiver mobile station or a group of interference cancellation capable receiver mobile stations.

In a fourth aspect, alone or in combination with one or more of the first through third aspects, the plurality of sidelink communications comprises a plurality of transmissions, and obtaining the indication of the overlap comprises obtaining an indication that the plurality of transmissions occurred in an overlapping resource.

In a fifth aspect, alone or in combination with one or more of the first through fourth aspects, the plurality of sidelink communications comprises a plurality of resource reservations, and obtaining the indication of the overlap comprises obtaining an indication that the plurality of resource reservations occurred in an overlapping resource, and that at least one of the resource reservations was intended for the mobile station.

In a sixth aspect, alone or in combination with one or more of the first through fifth aspects, detecting the conflict comprises obtaining an indication of whether a transmitter mobile station associated with at least one of the plurality of sidelink communications is a first type of transmitter mobile station or a second type of transmitter mobile station.

In a seventh aspect, alone or in combination with one or more of the first through sixth aspects, detecting the conflict further comprises obtaining an indication, based at least in part on the transmitter mobile station being the first type of transmitter mobile station, that the conflict exists between the plurality of sidelink communications, or obtaining an indication, based at least in part on the transmitter mobile station being the second type of transmitter mobile station, of whether the conflict exists between the plurality of sidelink communications based at least in part on information received from the second type of transmitter mobile station.

In an eighth aspect, alone or in combination with one or more of the first through seventh aspects, detecting the conflict comprises obtaining an indication of whether the conflict exists based at least in part on one or more reference signal received power (RSRP) measurements and based at least in part on any of the plurality of sidelink communications being intended for a mobile station that is not the interference cancellation capable receiver mobile station.

In a ninth aspect, alone or in combination with one or more of the first through eighth aspects, obtaining the indication of whether the conflict exists based at least in part on the RSRP measurement comprises obtaining an indication that the conflict exists based at least in part on the RSRP measurement of a transmitter mobile station, associated with a sidelink communication of the plurality of sidelink communications, being greater than an RSRP threshold.

In a tenth aspect, alone or in combination with one or more of the first through ninth aspects, obtaining the indication of whether the conflict exists based at least in part on the RSRP measurement comprises obtaining an indication that the conflict does not exist based at least in part on the RSRP measurements of all transmitter mobile stations, associated with the plurality of sidelink communications, being less than an RSRP threshold.

In an eleventh aspect, alone or in combination with one or more of the first through tenth aspects, obtaining the indication of whether the conflict exists based at least in part on the RSRP measurement comprises obtaining an indication that the conflict exists based at least in part on a first RSRP measurement of a first transmitter mobile station, associated with a sidelink communication of the plurality of sidelink communications that is not intended for the mobile station, being larger than a second RSRP measurement of a second transmitter mobile station, associated with a sidelink communication of the plurality of sidelink communications that is intended for the mobile station, by an amount that is greater that an RSRP difference threshold.

In a twelfth aspect, alone or in combination with one or more of the first through eleventh aspects, obtaining the indication of whether the conflict exists based at least in part on the RSRP measurement comprises obtaining an indication that the conflict does not exist based at least in part on a first RSRP measurement of a first transmitter mobile station, associated with a sidelink communication of the plurality of sidelink communications that is not intended for the mobile station, not being larger than a second RSRP measurement of a second transmitter mobile station, associated with a sidelink communication of the plurality of sidelink communications that is intended for the mobile station, by an amount that is greater that an RSRP difference threshold.

In a thirteenth aspect, alone or in combination with one or more of the first through twelfth aspects, detecting the conflict comprises obtaining an indication of whether the conflict exists based at least in part on a first RSRP measurement of a first transmitter mobile station that transmits a first communication that is intended for the mobile station, and a second RSRP measurement of a second transmitter mobile station that transmits a second communication that is not intended for the mobile station.

In a fourteenth aspect, alone or in combination with one or more of the first through thirteenth aspects, obtaining the indication of whether the conflict exists based at least in part on the first RSRP measurement and the second RSRP measurement comprises obtaining an indication that the conflict exists based at least in part on the second communication being intended for the interference cancellation capable receiver mobile station and based at least in part on the first RSRP measurement being greater than a first threshold, or obtaining an indication that the conflict exists based at least in part on the second communication not being intended for the interference cancellation capable receiver mobile station and based at least in part on the first RSRP measurement being greater than a second threshold.

In a fifteenth aspect, alone or in combination with one or more of the first through fourteenth aspects, the second threshold is larger than the first threshold.

In a sixteenth aspect, alone or in combination with one or more of the first through fifteenth aspects, process 900 includes transmitting an indication of the conflict between the plurality of sidelink communications.

In a seventeenth aspect, alone or in combination with one or more of the first through sixteenth aspects, transmitting the indication of the conflict comprises transmitting the indication of the conflict to a transmitter mobile station associated with a sidelink communication, of the plurality of sidelink communications, that is intended for the mobile station.

In an eighteenth aspect, alone or in combination with one or more of the first through seventeenth aspects, transmitting the indication of the conflict comprises transmitting the indication of the conflict to a transmitter mobile station associated with a sidelink communication, of the plurality of sidelink communications, that is not intended for the mobile station.

In a nineteenth aspect, alone or in combination with one or more of the first through eighteenth aspects, process 900 includes transmitting, via a unicast communication or a groupcast communication, information that indicates whether the mobile station is the interference cancellation capable receiver mobile station.

In a twentieth aspect, alone or in combination with one or more of the first through nineteenth aspects, an indication of whether the mobile station is the interference cancellation capable receiver mobile station is application specific.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
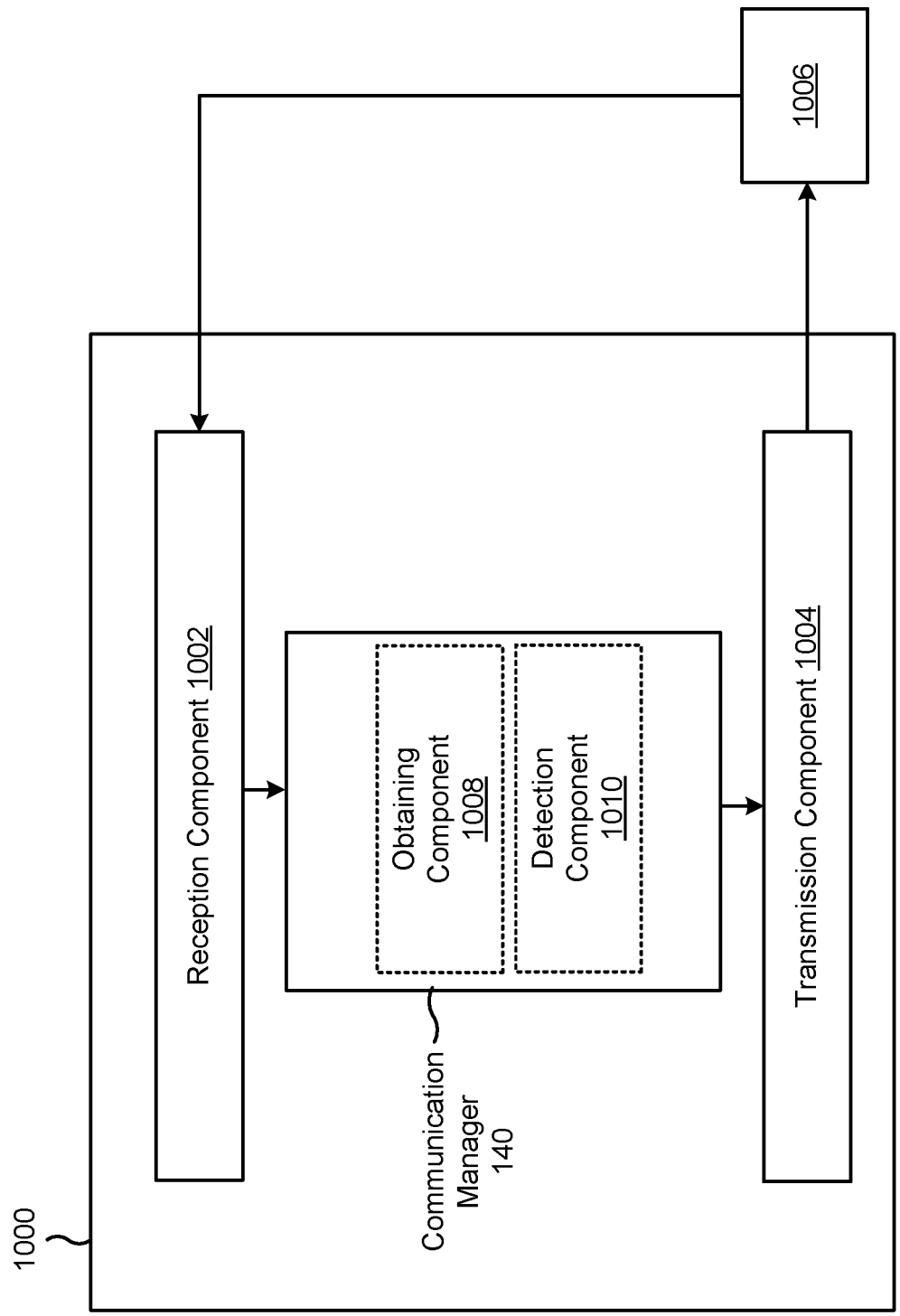
FIG. 10 is a diagram of an example apparatus for wireless communication, in accordance with the present disclosure.

FIG. 10 is a diagram of an example apparatus 1000 for wireless communication. The apparatus 1000 may be a mobile station, or a mobile station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include an obtaining component 1008 or a detection component 1010, among other examples.

In some aspects, the apparatus 1000 may be configured to perform one or more operations described herein in connection with FIG. 8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the mobile station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the mobile station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the mobile station described in connection with FIG. 2. In some aspects, the transmission component 1004 may be co-located with the reception component 1002 in a transceiver.

The obtaining component 1008 may obtain an indication of an overlap between a plurality of sidelink communications. The detection component 1010 may detect a conflict between the plurality of sidelink communications having the overlap based at least in part on whether the plurality of sidelink communications are intended for an interference cancellation capable receiver mobile station.

The reception component 1002 may receive sidelink control information that indicates whether a sidelink communication, of the plurality of sidelink communications, is intended for the interference cancellation capable receiver mobile station or a group of interference cancellation capable receiver mobile stations.

The transmission component 1004 may transmit an indication of the conflict between the plurality of sidelink communications.

The transmission component 1004 may transmit, via a unicast communication or a groupcast communication, information that indicates whether the mobile station is the interference cancellation capable receiver mobile station.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a mobile station, comprising: obtaining, by the mobile station, an indication of an overlap between a plurality of sidelink communications; and detecting, by the mobile station, a conflict between the plurality of sidelink communications having the overlap based at least in part on whether the plurality of sidelink communications are intended for an interference cancellation capable receiver mobile station.

Aspect 2: The method of Aspect 1, wherein detecting the conflict comprises detecting whether a conflict exists between the plurality of sidelink communications based at least in part on the plurality of sidelink communications being intended for at least one mobile station that is not the interference cancellation capable receiver mobile station.

Aspect 3: The method of any of Aspects 1-2, wherein detecting the conflict comprises detecting whether a conflict does not exist between the plurality of sidelink communications based at least in part on the plurality of sidelink communications being only intended for the interference cancellation capable receiver mobile station or a group of interference cancellation capable receiver mobile stations.

Aspect 4: The method of any of Aspects 1-3, further comprising receiving sidelink control information that indicates whether a sidelink communication, of the plurality of sidelink communications, is intended for the interference cancellation capable receiver mobile station or a group of interference cancellation capable receiver mobile stations.

Aspect 5: The method of any of Aspects 1-4, wherein the plurality of sidelink communications comprises a plurality of transmissions, and wherein obtaining the indication of the overlap comprises obtaining an indication that the plurality of transmissions occurred in an overlapping resource.

Aspect 6: The method of any of Aspects 1-5, wherein the plurality of sidelink communications comprises a plurality of resource reservations, and wherein obtaining the indication of the overlap comprises obtaining an indication that the plurality of resource reservations occurred in an overlapping resource, and that at least one of the resource reservations was intended for the mobile station.

Aspect 7: The method of any of Aspects 1-6, wherein detecting the conflict comprises obtaining an indication of whether a transmitter mobile station associated with at least one of the plurality of sidelink communications is a first type of transmitter mobile station or a second type of transmitter mobile station.

Aspect 8: The method of Aspect 7, wherein detecting the conflict further comprises: obtaining an indication, based at least in part on the transmitter mobile station being the first type of transmitter mobile station, that the conflict exists between the plurality of sidelink communications; or obtaining an indication, based at least in part on the transmitter mobile station being the second type of transmitter mobile station, of whether the conflict exists between the plurality of sidelink communications based at least in part on information received from the second type of transmitter mobile station.

Aspect 9: The method of any of Aspects 1-8, wherein detecting the conflict comprises: obtaining an indication of whether the conflict exists based at least in part on one or more reference signal received power (RSRP) measurements and based at least in part on any of the plurality of sidelink communications being intended for a mobile station that is not the interference cancellation capable receiver mobile station.

Aspect 10: The method of Aspect 9, wherein obtaining the indication of whether the conflict exists based at least in part on the RSRP measurement comprises: obtaining an indication that the conflict exists based at least in part on the RSRP measurement of a transmitter mobile station, associated with a sidelink communication of the plurality of sidelink communications, being greater than an RSRP threshold.

Aspect 11: The method of Aspect 9, wherein obtaining the indication of whether the conflict exists based at least in part on the RSRP measurement comprises: obtaining an indication that the conflict does not exist based at least in part on the RSRP measurements of all transmitter mobile stations, associated with the plurality of sidelink communications, being less than an RSRP threshold.

Aspect 12: The method of Aspect 9, wherein obtaining the indication of whether the conflict exists based at least in part on the RSRP measurement comprises: obtaining an indication that the conflict exists based at least in part on a first RSRP measurement of a first transmitter mobile station, associated with a sidelink communication of the plurality of sidelink communications that is not intended for the mobile station, being larger than a second RSRP measurement of a second transmitter mobile station, associated with a sidelink communication of the plurality of sidelink communications that is intended for the mobile station, by an amount that is greater that an RSRP difference threshold.

Aspect 13: The method of Aspect 9, wherein obtaining the indication of whether the conflict exists based at least in part on the RSRP measurement comprises: obtaining an indication that the conflict does not exist based at least in part on a first RSRP measurement of a first transmitter mobile station, associated with a sidelink communication of the plurality of sidelink communications that is not intended for the mobile station, not being larger than a second RSRP measurement of a second transmitter mobile station, associated with a sidelink communication of the plurality of sidelink communications that is intended for the mobile station, by an amount that is greater that an RSRP difference threshold.

Aspect 14: The method of any of Aspects 1-13, wherein detecting the conflict comprises: obtaining an indication of whether the conflict exists based at least in part on a first RSRP measurement of a first transmitter mobile station that transmits a first communication that is intended for the mobile station, and a second RSRP measurement of a second transmitter mobile station that transmits a second communication that is not intended for the mobile station.

Aspect 15: The method of Aspect 14, wherein obtaining the indication of whether the conflict exists based at least in part on the first RSRP measurement and the second RSRP measurement comprises: obtaining an indication that the conflict exists based at least in part on the second communication being intended for the interference cancellation capable receiver mobile station and based at least in part on the first RSRP measurement being greater than a first threshold; or obtaining an indication that the conflict exists based at least in part on the second communication not being intended for the interference cancellation capable receiver mobile station and based at least in part on the first RSRP measurement being greater than a second threshold.

Aspect 16: The method of Aspect 15, wherein the second threshold is larger than the first threshold.

Aspect 17: The method of any of Aspects 1-16, further comprising transmitting an indication of the conflict between the plurality of sidelink communications.

Aspect 18: The method of Aspect 17, wherein transmitting the indication of the conflict comprises transmitting the indication of the conflict to a transmitter mobile station associated with a sidelink communication, of the plurality of sidelink communications, that is intended for the mobile station.

Aspect 19: The method of Aspect 17, wherein transmitting the indication of the conflict comprises transmitting the indication of the conflict to a transmitter mobile station associated with a sidelink communication, of the plurality of sidelink communications, that is not intended for the mobile station.

Aspect 20: The method of any of Aspects 1-19, further comprising transmitting, via a unicast communication or a groupcast communication, information that indicates whether the mobile station is the interference cancellation capable receiver mobile station.

Aspect 21: The method of any of Aspects 1-20, wherein an indication of whether the mobile station is the interference cancellation capable receiver mobile station is application specific.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a mobile station, comprising:
one or more memories; and
one or more processors, based at least in part on information stored in the one or more memories, configured to:
obtain an indication of an overlap between a plurality of sidelink communications; and
detect a conflict between the plurality of sidelink communications based at least in part on whether the plurality of sidelink communications are intended for an interference cancellation capable receiver mobile station and based at least in part on a type of a transmitter mobile station associated with at least one sidelink communication of the plurality of sidelink communications, wherein the type of the transmitter mobile station is based at least in part on whether the transmitter mobile station supports interference cancellation capabilities.

2. The apparatus of claim 1, wherein the one or more processors, to detect the conflict, are configured to detect whether a conflict exists between the plurality of sidelink communications based at least in part on the plurality of sidelink communications being intended for at least one mobile station that is not the interference cancellation capable receiver mobile station.

3. The apparatus of claim 1, wherein the one or more processors, to detect the conflict, are configured to detect whether a conflict does not exist between the plurality of sidelink communications based at least in part on the plurality of sidelink communications being only intended for the interference cancellation capable receiver mobile station or a group of interference cancellation capable receiver mobile stations.

4. The apparatus of claim 1, wherein the one or more processors are further configured to receive sidelink control information that indicates whether a sidelink communication, of the plurality of sidelink communications, is intended for the interference cancellation capable receiver mobile station or a group of interference cancellation capable receiver mobile stations.

5. The apparatus of claim 1, wherein the plurality of sidelink communications comprises a plurality of transmissions, and wherein obtaining the indication of the overlap comprises obtaining an indication that the plurality of transmissions occurred in an overlapping resource.

6. The apparatus of claim 1, wherein the plurality of sidelink communications comprises a plurality of resource reservations, and wherein obtaining the indication of the overlap comprises obtaining an indication that the plurality of resource reservations occurred in an overlapping resource, and that at least one of the resource reservations was intended for the mobile station.

7. The apparatus of claim 1, wherein the one or more processors, to detect the conflict, are configured to obtain an indication of the type of the transmitter mobile station.

8. The apparatus of claim 1, wherein the one or more processors, to detect the conflict, are configured to:
obtain an indication, based at least in part on the transmitter mobile station being a first type of transmitter mobile station, that the conflict exists between the plurality of sidelink communications; or
obtain an indication, based at least in part on the transmitter mobile station being a second type of transmitter mobile station, of whether the conflict exists between the plurality of sidelink communications based at least in part on information received from the second type of transmitter mobile station.

9. The apparatus of claim 1, wherein the one or more processors, to detect the conflict, are configured to:
obtain an indication of whether the conflict exists based at least in part on one or more reference signal received power (RSRP) measurements and based at least in part on any of the plurality of sidelink communications being intended for a mobile station that is not the interference cancellation capable receiver mobile station.

10. The apparatus of claim 9, wherein the one or more processors, to obtain the indication of whether the conflict exists based at least in part on the RSRP measurement, are configured to:
obtain an indication that the conflict exists based at least in part on the RSRP measurement of the transmitter mobile station being greater than an RSRP threshold.

11. The apparatus of claim 9, wherein the one or more processors, to obtain the indication of whether the conflict exists based at least in part on the RSRP measurement, are configured to:
obtain an indication that the conflict does not exist based at least in part on the RSRP measurements of all transmitter mobile stations, associated with the plurality of sidelink communications, being less than an RSRP threshold.

12. The apparatus of claim 9, wherein the at least one sidelink communication is a sidelink communication of the plurality of sidelink communications that is intended for the mobile station, and wherein the one or more processors, to obtain the indication of whether the conflict exists based at least in part on the RSRP measurement, are configured to:
obtain an indication that the conflict exists based at least in part on a first RSRP measurement of another transmitter mobile station, associated with a sidelink communication of the plurality of sidelink communications that is not intended for the mobile station, being larger than a second RSRP measurement of the transmitter mobile station, associated with the at least one sidelink communication, by an amount that is greater that an RSRP difference threshold.

13. The apparatus of claim 9, wherein the at least one sidelink communication is a sidelink communication of the plurality of sidelink communications that is intended for the mobile station, and wherein the one or more processors, to obtain the indication of whether the conflict exists based at least in part on the RSRP measurement, are configured to:
obtain an indication that the conflict does not exist based at least in part on a first RSRP measurement of another transmitter mobile station, associated with a sidelink communication of the plurality of sidelink communications that is not intended for the mobile station, not being larger than a second RSRP measurement of the transmitter mobile station, associated with the at least one sidelink communication, by an amount that is greater that an RSRP difference threshold.

14. The apparatus of claim 1, wherein the transmitter mobile station is a first transmitter mobile station, and wherein the one or more processors, to detect the conflict, are configured to:
obtain an indication of whether the conflict exists based at least in part on a first RSRP measurement of the first transmitter mobile station that transmits a first communication that is intended for the mobile station, and a second RSRP measurement of a second transmitter mobile station that transmits a second communication that is not intended for the mobile station.

15. The apparatus of claim 14, wherein the one or more processors, to obtain the indication of whether the conflict exists based at least in part on the first RSRP measurement and the second RSRP measurement, are configured to:
obtain an indication that the conflict exists based at least in part on the second communication being intended for the interference cancellation capable receiver mobile station and based at least in part on the first RSRP measurement being greater than a first threshold; or
obtain an indication that the conflict exists based at least in part on the second communication not being intended for the interference cancellation capable receiver mobile station and based at least in part on the first RSRP measurement being greater than a second threshold.

16. The apparatus of claim 15, wherein the second threshold is larger than the first threshold.

17. The apparatus of claim 1, wherein the one or more processors are further configured to transmit an indication of the conflict between the plurality of sidelink communications.

18. The apparatus of claim 17, wherein the one or more processors, to transmit the indication of the conflict, are configured to transmit the indication of the conflict to the transmitter mobile station, and wherein the at least one sidelink communication is a sidelink communication, of the plurality of sidelink communications, that is intended for the mobile station.

19. The apparatus of claim 17, wherein the one or more processors, to transmit the indication of the conflict, are configured to transmit the indication of the conflict to the transmitter mobile station, and wherein the at least one sidelink communication is a sidelink communication, of the plurality of sidelink communications, that is not intended for the mobile station.

20. The apparatus of claim 1, wherein the one or more processors are further configured to transmit, via a unicast communication or a groupcast communication, information that indicates whether the mobile station is the interference cancellation capable receiver mobile station.

21. The apparatus of claim 1, wherein an indication of whether the mobile station is the interference cancellation capable receiver mobile station is application specific.

22. A method of wireless communication performed by a mobile station, comprising:
- obtaining, by the mobile station, an indication of an overlap between a plurality of sidelink communications; and
- detecting, by the mobile station, a conflict between the plurality of sidelink communications based at least in part on whether the plurality of sidelink communications are intended for an interference cancellation capable receiver mobile station and based at least in part on a type of a transmitter mobile station associated with at least one sidelink communication of the plurality of sidelink communications, wherein the type of the transmitter mobile station is based at least in part on whether the transmitter mobile station supports interference cancellation capabilities.

23. The method of claim 22, wherein detecting the conflict comprises detecting whether a conflict exists between the plurality of sidelink communications based at least in part on the plurality of sidelink communications being intended for at least one mobile station that is not the interference cancellation capable receiver mobile station.

24. The method of claim 22, wherein detecting the conflict comprises detecting whether a conflict does not exist between the plurality of sidelink communications based at least in part on the plurality of sidelink communications being only intended for the interference cancellation capable receiver mobile station or a group of interference cancellation capable receiver mobile stations.

25. The method of claim 22, further comprising receiving sidelink control information that indicates whether a sidelink communication, of the plurality of sidelink communications, is intended for the interference cancellation capable receiver mobile station or a group of interference cancellation capable receiver mobile stations.

26. The method of claim 22, wherein the plurality of sidelink communications comprises a plurality of transmissions, and wherein obtaining the indication of the overlap comprises obtaining an indication that the plurality of transmissions occurred in an overlapping resource.

27. The method of claim 22, wherein the plurality of sidelink communications comprises a plurality of resource reservations, and wherein obtaining the indication of the overlap comprises obtaining an indication that the plurality of resource reservations occurred in an overlapping resource, and that at least one of the resource reservations was intended for the mobile station.

28. The method of claim 22, wherein detecting the conflict comprises:
- obtaining an indication of whether the conflict exists based at least in part on one or more reference signal received power (RSRP) measurements and based at least in part on any of the plurality of sidelink communications being intended for a mobile station that is not the interference cancellation capable receiver mobile station.

29. The method of claim 22, wherein the transmitter mobile station is a first transmitter mobile station, and wherein detecting the conflict comprises:
- obtaining an indication of whether the conflict exists based at least in part on a first RSRP measurement of the first transmitter mobile station that transmits a first communication that is intended for the mobile station, and a second RSRP measurement of a second transmitter mobile station that transmits a second communication that is not intended for the mobile station.

30. A non-transitory computer-readable medium storing a set of instructions for wireless communication, the set of instructions comprising:
- one or more instructions that, when executed by one or more processors of a mobile station, cause the mobile station to:
  - obtain an indication of an overlap between a plurality of sidelink communications; and
  - detect a conflict between the plurality of sidelink communications based at least in part on whether the plurality of sidelink communications are intended for an interference cancellation capable receiver mobile station and based at least in part on a type of a transmitter mobile station associated with at least one sidelink communication of the plurality of sidelink communications, wherein the type of the transmitter mobile station is based at least in part on whether the transmitter mobile station supports interference cancellation capabilities.

* * * * *